(12) United States Patent
Narampanawe et al.

(10) Patent No.: US 11,659,339 B2
(45) Date of Patent: *May 23, 2023

(54) BATTERY MODULE AND HEARING DEVICE

(71) Applicant: Sivantos Pte. Ltd., Singapore (SG)

(72) Inventors: Nishshanka Bandara Narampanawe, Singapore (SG); Heng Goh Yap, Singapore (SG); Anand Ganapathy, Singapore (SG); Ruban Sundara Raj Thasapparaj, Salem Tamil Nadu (IN); Gee Heng Ler, Penang Malaysia (MY)

(73) Assignee: Sivantos Pte. Ltd., Singapore (SG)

( * ) Notice: Subject to any disclaimer, the term of this patent is extended or adjusted under 35 U.S.C. 154(b) by 102 days.

This patent is subject to a terminal disclaimer.

(21) Appl. No.: 17/238,442

(22) Filed: Apr. 23, 2021

(65) Prior Publication Data
US 2021/0337319 A1 Oct. 28, 2021

(30) Foreign Application Priority Data

Apr. 23, 2020 (DE) .......................... 102020205157.7

(51) Int. Cl.
*H04R 25/00* (2006.01)
*H02J 50/10* (2016.01)
*H02J 7/00* (2006.01)

(52) U.S. Cl.
CPC ............ *H04R 25/30* (2013.01); *H02J 7/0044* (2013.01); *H02J 50/10* (2016.02); *H04R 2225/31* (2013.01)

(58) Field of Classification Search
CPC ................ H04R 25/554; H04R 25/602; H04R 2225/31; H04R 2225/33
See application file for complete search history.

(56) References Cited

U.S. PATENT DOCUMENTS

| 8,224,007 | B2 | 7/2012 | Petersen et al. |
| 9,161,141 | B2 | 10/2015 | Martius et al. |
| 9,647,462 | B2 | 5/2017 | Angst et al. |
| 10,536,788 | B2 | 1/2020 | Nikles et al. |
| 10,542,359 | B2 | 1/2020 | Singer et al. |

(Continued)

FOREIGN PATENT DOCUMENTS

| CN | 101107736 A | 1/2008 |
| CN | 103283262 A | 9/2013 |

(Continued)

*Primary Examiner* — Suhan Ni
(74) *Attorney, Agent, or Firm* — Laurence A. Greenberg; Werner H. Stemer; Ralph E. Locher

(57) ABSTRACT

A battery module for a hearing device includes a secondary cell and two contact elements for making contact with the secondary cell at two different potential areas. A fuse which is arranged at a short distance from the contact element that is assigned to a positive potential. A copper jacket surrounds the secondary cell, and a ferrite jacket is arranged on the outside of the copper jacket. An induction coil is arranged on the outside of the ferrite jacket and is configured to inductively receive energy for charging the battery module. A resonant capacitor is coupled to the induction coil at a short distance from the latter. A thermistor for monitoring a cell temperature is arranged with electrical insulation from the secondary cell but is coupled to the latter with low thermal resistance using heat-transfer capability.

17 Claims, 6 Drawing Sheets

(56) References Cited

U.S. PATENT DOCUMENTS

| | | | |
|---|---|---|---|
| 10,667,066 B2 | 5/2020 | Beyfuss et al. | |
| 2002/0113572 A1 | 8/2002 | Zink et al. | |
| 2008/0165982 A1* | 7/2008 | Hankey | H04R 5/033 |
| | | | 381/74 |
| 2012/0248888 A1* | 10/2012 | Kesler | H02J 50/90 |
| | | | 307/104 |
| 2019/0261100 A1 | 8/2019 | Troelsen et al. | |

FOREIGN PATENT DOCUMENTS

| | | |
|---|---|---|
| CN | 104009511 A | 8/2014 |
| CN | 109104679 A | 12/2018 |
| CN | 109644310 A | 4/2019 |
| CN | 110177327 A | 8/2019 |
| DE | 102017209813 B3 | 9/2018 |
| DE | 102017219973 A1 | 9/2018 |
| DE | 102018217468 A1 | 9/2019 |
| EP | 3413587 A1 | 12/2018 |
| EP | 3840417 A1 | 6/2021 |

\* cited by examiner

BATTERY MODULE AND HEARING DEVICE

CROSS-REFERENCE TO RELATED APPLICATION

This application claims the priority, under 35 U.S.C. § 119, of German patent application DE 10 2020 205 157.7, filed Apr. 23, 2020; the prior application is herewith incorporated by reference in its entirety.

BACKGROUND OF THE INVENTION

Field of the Invention

The invention relates to a battery module for a hearing device. Furthermore, the invention relates to a hearing device, in particular a hearing aid device, preferably an ITE hearing aid, having such a battery module.

Hearing devices are typically used to output an audio signal to the sense of hearing of the wearer of this hearing device. The output takes place by means of an output transducer, usually acoustically via airborne sound by means of a loudspeaker (also referred to as a "receiver"). Such hearing devices are frequently used as so-called hearing aid devices (also for short: hearing aids), which are used for the treatment of a person having a hearing loss. For this purpose, the hearing devices normally comprise an acoustic input transducer (in particular a microphone) and a signal processor, which is configured to process the input signal (also: microphone signal) generated by the input transducer from the ambient sound with application of at least one signal processing algorithm typically stored in a user-specific manner in such a way that the hearing loss of the wearer of the hearing device is at least partially compensated for. In particular in the case of a hearing aid device, the output transducer can be, in addition to a loudspeaker, alternatively also a so-called bone vibrator or a cochlear implant, which are configured to mechanically or electrically couple the audio signal into the sense of hearing of the wearer. The term "hearing device," as used herein, also includes in particular devices, e.g., so-called tinnitus maskers, headsets, headphones, and the like.

In the meantime, rechargeable energy accumulators (in particular in the form of secondary cells, also referred to as "accumulators") have been used more and more to supply power to the electronic components of the hearing device. It is fundamentally conceivable to replace conventional battery formats with identical-format secondary cells. However, since the latter usually output other voltage values, a converter electronics unit for voltage conversion to the voltage values required by the electronic components is generally necessary, so that solely an exchange is usually not possible. Moreover, it is to be possible to recharge the secondary cells even without removing them from the corresponding hearing device, in order to increase the usage convenience. Since hearing devices, in particular hearing aid devices, are generally worn on the body and are thus subjected to bodily fluids, in particular sweat, wireless charging is additionally desirable. This is because in this way the housing of the hearing device can be made particularly leak-tight.

Wireless charging typically takes place by means of an inductive charging coil which is coupled wirelessly, specifically inductively, in charging operation to a transmission coil arranged in a charging device. In this case, however—possibly in addition to the above-described converter electronics unit (if the electronic components are not adapted with respect to their operating voltage value to the output voltage of the secondary cell)—a charging electronics unit is required for controlling the (cell-side) charging procedure. This is usually combined jointly with the secondary cell to form a "battery module."

For inductive charging, a comparatively precise arrangement of the charging coil in relation to the transmission coil is required. Furthermore, the two coils also have to be arranged at a comparatively short distance from one another (usually in the range of approximately 3 millimeters). Otherwise, the possible energy yield during the energy transfer is impaired, which results in long charging cycles or even in inadequate or at worst impossible charging of the secondary coil. In particular in the case of hearing devices to be worn in the ear (in particular in the case of so-called "in the ear hearing aid devices", also referred to for short as ITE—for "in the ear"), such a precise or close arrangement in relation to one another is usually not possible, however, for example due to frequently individually adapted housings.

BRIEF SUMMARY OF THE INVENTION

It is accordingly an object of the invention to provide a battery module which overcomes a variety of disadvantages of the heretofore-known devices and methods of this general type and which provides for improved wireless charging. It is a further object to provide a hearing device with an improved battery module.

With the above and other objects in view there is provided, in accordance with the invention, a battery module for a hearing device, the battery module comprising:
  a secondary cell having a positive potential and a negative potential;
  two contact elements, including a contact element for making contact with the positive potential of said secondary cell and a contact element for making contact with the negative potential of said secondary cell;
  a fuse arranged in close vicinity of said contact element for making contact with the positive potential;
  a copper jacket surrounding said secondary cell;
  a ferrite jacket arranged on an outside of said copper jacket;
  an induction coil arranged on an outside of said ferrite jacket, said induction coil being configured to inductively receive energy;
  a resonant capacitor connected to said induction coil in close vicinity of said induction coil; and
  a thermistor for monitoring a cell temperature, said thermistor being electrically insulated with respect to said secondary cell but thermally coupled to said secondary cell with low thermal resistance for heat transfer between said secondary cell and said thermistor.

The battery module according to the invention is configured and provided for use in a hearing device, in particular a hearing aid device (for short: "hearing aid"), preferably an ITE hearing aid device (i.e., a hearing aid device to be worn in the ear, referred to for short as "ITE").

Specifically, the battery module according to the invention has a secondary cell (also referred to as an "accumulator" or rechargeable battery) and two contact elements for making contact with the secondary cell in two different potential areas. The battery module also has a fuse which is arranged at a short distance from the contact element assigned to a positive potential. This fuse is used, in particular, to protect against or from short circuits, in particular in the secondary cell, with respect to a downstream circuit, in particular a downstream electronics unit. The battery module also has a copper jacket which surrounds the secondary cell (in particular closed in an annular manner), and a ferrite jacket which is arranged on the outside of the copper jacket (and, in particular, is closed in an annular manner in the same way as the copper jacket). The battery module also has an induction coil which is arranged on the outside of the ferrite jacket and is configured to inductively receive energy. In particular for the purpose of setting a resonant frequency at which the highest possible energy yield from the energy inductively transmitted to the induction coil is enabled during intended charging operation, the battery module has a resonant capacitor which is coupled to the induction coil (electrically, in particular galvanically) at a short distance from the latter. The battery module also has a thermistor which is used to monitor a cell temperature of the secondary cell, in particular during charging operation, wherein the thermistor is arranged in a manner electrically insulated from the secondary cell but is coupled to the latter with low thermal resistance using heat-transfer technology.

On account of the copper jacket interposed between the secondary cell and the ferrite jacket, eddy currents and therefore eddy current losses and/or the skin effect are advantageously reduced or can even be prevented, in particular inside the secondary cell during charging operation. As a result, the energy yield on the side of the battery module is in turn improved. On account of the possibility, provided by the resonant capacitor, of setting the resonant frequency, in particular of the induction coil, preferably of adapting it to the charging frequency output by a transmission coil of a charging device and therefore of operating at resonance with the charging device, it is possible to carry out a resonant charging method which has a narrow band in comparison with an inductive charging method which usually conventionally has a wide band (that is to say the transmission coil and the induction coil, in particular, are inductively coupled here in a resonant manner) and a possible distance between the transmission coil and the induction coil and optionally also a tolerance with respect to an "imprecise" arrangement with respect to one another can be increased in the process. As a result, the battery module according to the invention is also suitable for use in an ITE.

The secondary cell is preferably in the form of a circular cylindrical body having at least approximately (that is to say within conventional tolerances) parallel end faces. In particular, the shape of the secondary cell resembles that of a button cell.

The fuse is optionally in the form of a component which is closed per se, for example in the form of a safety fuse, or is alternatively in the form of an integrated (fuse) circuit.

In an optional configuration, the battery module comprises a converter electronics unit in order to convert the voltage provided by the secondary cell, specifically the corresponding voltage value, to an (operating) voltage value required by an electronics unit of the hearing device. In addition, or as an alternative, to the converter electronics unit, the battery module preferably comprises a charging electronics unit which controls and/or monitors the charging of the secondary cell by means of the induction coil (or optionally also by means of galvanic contacts).

In one expedient embodiment, the two contact elements are electrically insulated with respect to the battery at least in certain sections by means of an insulation layer in the intended assembly state. In particular, the two contact elements, which are preferably formed by a sheet metal strip in each case, make contact with a downstream circuit (or at least one conductor track) at adjacent locations, in particular in the region of the lateral surface of the secondary cell. As a result, the two contact elements are beside one another in a region which is usually assigned to one of the two potential areas (also: pole or contact areas). In this case, an insulation layer is therefore preferably arranged on the lateral surface of the secondary cell below the contact elements. For example, the insulation layer is a self-adhesive plastic film or a varnish layer.

In one expedient development, the thermistor is on the above-mentioned insulation layer. As a result, a short circuit of the thermistor itself is prevented on account of the surface of the secondary cell which is usually formed from electrically conductive material. In addition, the thermal resistance of this insulation layer is negligible, with the result that the current temperature value of the secondary cell can be tapped off in a particularly accurate and short-circuit-proof manner by means of the thermistor.

In one advantageous embodiment, the ferrite jacket is in the form of an inherently stable injection-molded component, in particular an injection-molded component which is rigid or stiff per se. In this case, the ferrite jacket forms a type of supporting structure in which the secondary cell can be accommodated and on which the elements of the battery module which are described here and below (in particular the induction coil and optionally also the above-mentioned circuit arranged downstream of the contact elements) can be held.

In an alternative embodiment, the ferrite jacket is formed from a comparatively flexible, in particular pliable, film material. The film material is preferably a multilayer plastic composite film containing a layer formed from magnetic material, in particular a material containing soft-magnetic ferrite.

In one preferred embodiment, the copper jacket is formed from a copper film, preferably coated with an insulation layer at least on the inside. In this case, the copper jacket is preferably formed in a pot-like manner, that is to say the copper film is used not only to form a strip-like ring, but rather the ring is "capped" with a "bottom surface" on one side. This bottom surface is preferably connected to the ring in one piece at at least one location, in particular by cutting a strip with a lateral bulge, which subsequently forms the bottom surface, out of the flat plastic film, placing the strip with respect to the ring and folding up the bulge as the bottom surface.

In one expedient development, the copper film has a thickness of at least 0.08 millimeters (without an insulation layer and without an adhesive layer which is possibly present), in particular 0.2 millimeters. As described above, the copper film is cut to size in a strip-like manner in an intermediate manufacturing step. In the present embodiment, this strip has hooking structures which are in each case complementary to one another at the ends and are hooked into one another according to the lock-and-key principle to form the (annular) jacket. Alternatively, the ends of the copper film overlap one another. The ring shape of the copper jacket means that eddy currents flow in the copper jacket and advantageously do not occur or occur only to a slight extent in the secondary cell. The bottom surface described above is preferably also present in this embodiment. The thickness of 0.2 millimeters advantageously means in this case that the copper jacket has a comparatively high stability, with the result that the flexible ferrite jacket can be fastened thereto, in particular.

In one advantageous embodiment, the insulation layer described with respect to the copper jacket also coats the outside of the copper film. In this case, the thermistor is optionally on the outside of the copper film.

In one expedient embodiment, the battery module has a circuit carrier which carries at least the fuse, the resonant capacitor and the thermistor. The circuit carrier optionally also carries a—in particular further—(smoothing) capacitor and a diode which together preferably form a rectifier circuit. The circuit carrier preferably also has connections (for example in the form of conductor track ends and/or solder pads) in order to be able to electrically couple an electronics unit of the hearing device to the battery module.

In one preferred development, the circuit carrier is flexible, in particular is in the form of a so-called flexible printed circuit board (or: "Flex PCB"). In this case, this flexible circuit carrier is arranged so as to encircle the ferrite jacket (that is to say surround it in an annular manner) and carries the induction coil in the form of a conductor track (which is printed on or applied in another manner). Contact is preferably made with this conductor track across abutment edges of the annularly bend printed circuit board which rest on one another, for example by means of soldering, contact adhesives or the like.

In an optional configuration, the copper film of the copper jacket has a thickness of less than 0.15 millimeters, in particular approximately 0.13 millimeters, but at least 0.08 millimeters (without an insulation layer and without an adhesive layer which is possibly present) and is therefore comparatively pliable. In this case, the ends of the copper film preferably overlap. In this case, the induction coil is applied to the ferrite jacket, which is expediently in the form of an injection-molded component, as a braided coil or wire coil (preferably with only two turns and, in particular, a diameter of the braid or wire of approximately 0.3 millimeters, in particular at least 0.28 millimeters). The induction coil is preferably formed from copper.

The induction coil is preferably arranged centrally with respect to the ferrite jacket when seen in the longitudinal direction or axial direction of the ferrite jacket.

This variant of the battery module is preferably formed by applying the contact elements and the insulation layer assigned to the latter to the secondary cell. The copper jacket, preferably with an insulation layer on all sides, is then applied to the secondary cell by means of an adhesive strip or a comparable adhesive layer. The circuit carrier, which in this variant extends only over a fraction of the lateral surface of the secondary cell, is then applied to the copper jacket, in particular likewise using an adhesive strip or a comparable adhesive layer, and is conductively connected, in particular soldered, to the contact elements. In this case, the thermistor is preferably applied to the outside of the comparatively thin copper film. The assembly resulting from the above steps is then pushed into the inherently stable, injection-molded ferrite jacket and the induction coil is wound onto the latter. The induction coil is then conductively connected, for example soldered, to corresponding conductor tracks of the circuit carrier.

In an alternative configuration, the battery module has the comparatively thick copper jacket, the flexible ferrite jacket and the induction coil which is in the form of a conductor track on the flexible circuit carrier. In this case, the copper jacket is placed around the secondary cell (and, in particular, the bottom surface is also folded on). The ferrite film is then adhesively bonded to the copper film by means of an adhesive strip (or a comparable adhesive layer). The flexible circuit carrier is adhesively bonded to the circuit carrier (by means of an adhesive layer or adhesive strip arranged on the outside of the ferrite film or on the inside of the circuit carrier). The contact elements are then connected to corresponding conductor tracks of the circuit carrier in an electrically conductive manner.

The battery module preferably has dimensions of less than 10.8 millimeters in diameter (possibly while disregarding contact lugs of the circuit carrier for connection to the electronics of the hearing device). As a result, use in the ITE is enabled or at least advantageously supported.

The hearing device according to the invention, in particular the hearing aid, preferably the ITE, has the battery module described above. In particular, the hearing device therefore also likewise has the advantages emerging from the battery module.

Other features which are considered as characteristic for the invention are set forth in the appended claims.

Although the invention is illustrated and described herein as embodied in a battery module and hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts which correspond to one another are provided with the same reference signs throughout the figures.

DETAILED DESCRIPTION OF THE INVENTION

Figure 1:
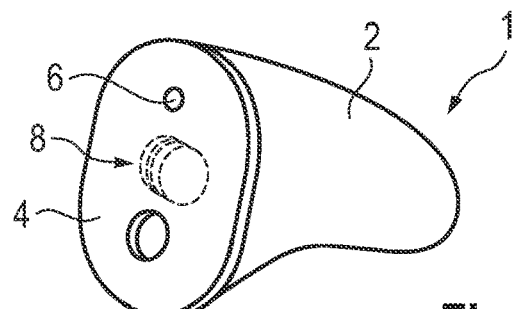
FIG. 1 is a schematic, perspective view of a hearing aid device.

Referring now to the figures of the drawing in detail and first, in particular, to FIG. 1 thereof, there is shown a schematic illustration of a hearing device in the form of a hearing aid device, here specifically a hearing aid device to be worn in the ear (for short: "ITE 1—in the ear"). The ITE 1 has a housing 2 which is adapted to fit the ear canal. The housing 2 surrounds a housing interior which accommodates a plurality of electronic components. The housing 2 has a so-called cover plate or "faceplate 4" for closing the housing interior. As electronic components, the ITE 1 comprises at least one microphone which is fluidically connected to the environment by means of a microphone opening 6. In addition, the ITE 1 comprises a signal processor which is not illustrated in any more detail as well as a battery module 8 which is used to supply energy to the electronic components.

The battery module 8 comprises a secondary cell 10 and an induction coil 12 for inductively, wirelessly charging the secondary cell 10. The structure of the battery module 8 is described in more detail below.

Figure 2:
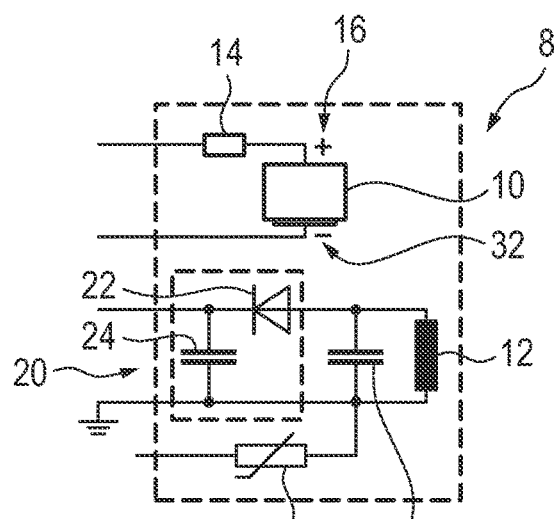
FIG. 2 shows a schematic circuit diagram of the battery module.
Figure 3:
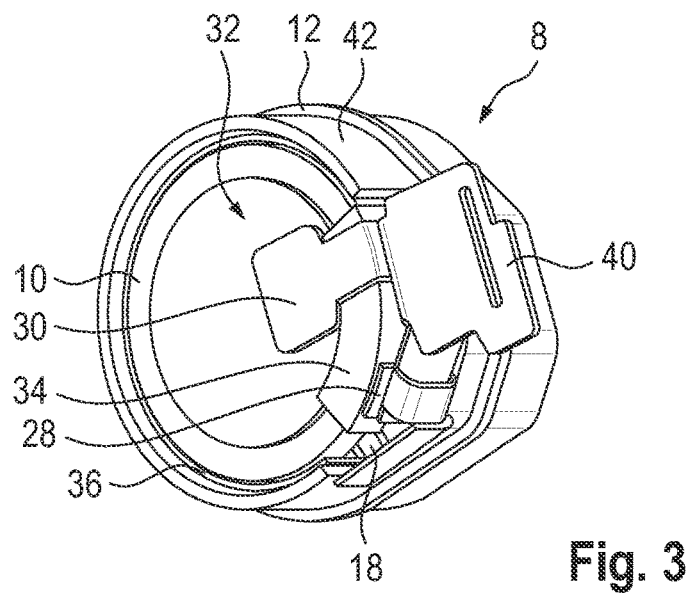
FIG. 3 shows a schematic perspective view of a battery module of the hearing aid device.
Figure 4:
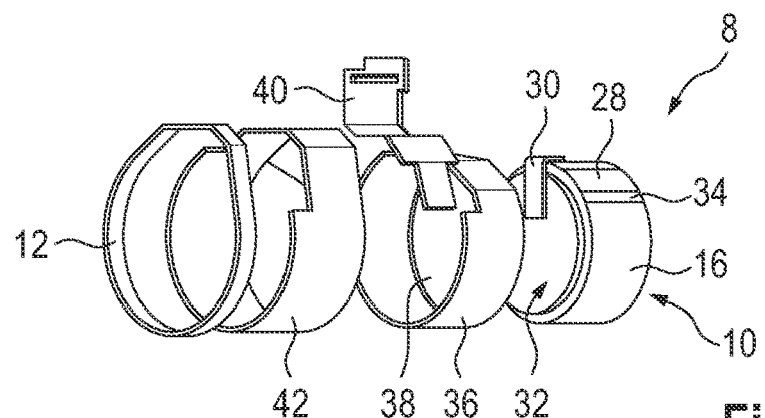
FIG. 4 shows a schematic exploded illustration of the battery module.

In this case, FIG. 2 first of all illustrates the basic structure of the battery module 8 on the basis of a schematic circuit diagram. The battery module 8 is specifically configured and provided for inductive charging by means of a so-called magnetic resonant charging method. In this case, the battery module 8 has a fuse 14 which is connected to a potential area (also referred to as "positive pole 16") of the secondary cell 10, which is assigned to a positive potential, without the interposition of other electronic components. In this case, the fuse 14 is also arranged at the shortest possible distance (with respect to a line length) from, i.e., in close vicinity to, the positive pole 16 (described in more detail below). The battery module 8 also has a resonant capacitor 18 which is connected to the two connection ends of the induction coil 12, likewise without the interposition of other electronic components. The resonant capacitor 18 is used to set the resonant frequency, specifically in relation to the frequency of an associated inductive charging device, for the resonant charging method. The induction coil 12 is also connected to a rectifier circuit 20 of the battery module 8, which is used to rectify AC voltage into DC voltage and, for this purpose, comprises a diode 22 (specifically a Schottky diode) and a smoothing capacitor 24. The battery module 8 also comprises a thermistor 26 for monitoring the temperature of the secondary cell 10, in particular during charging operation.

FIGS. 3-7 illustrate a first exemplary embodiment of the battery module 8 in more detail. In addition to the components described above, the battery module 8 comprises a first contact element 28, which is assigned to the positive pole 16 of the secondary cell 10, and a second contact element 30 which is assigned to the negative pole 32 (that is to say the corresponding potential area) of the secondary cell 10. The two contact elements 28 and 30 rest on opposite end faces of the secondary cell 10 and are angled toward the lateral surface of the secondary cell 10. In order to avoid a short circuit between the contact elements 28 and 30, specifically between the second contact element 30 and the positive pole 16 which also forms the lateral surface, a film 34 is arranged between the lateral surface and the two contact elements 28 and 30 as an insulation layer.

Figure 8:
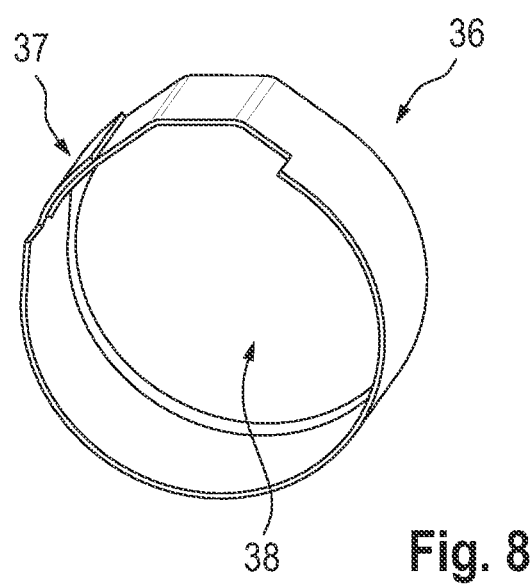
FIG. 8 shows a schematic individual view of a copper jacket of the battery module.
Figure 9:
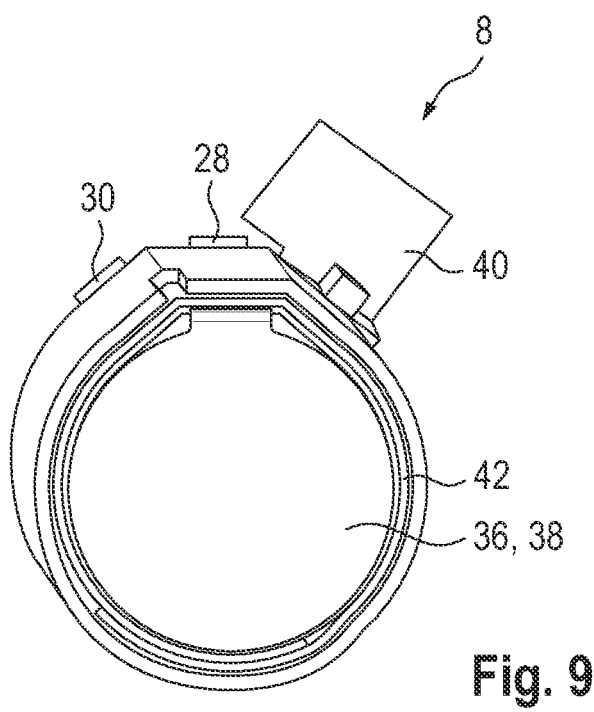
FIG. 9 shows a schematic perspective view of a further exemplary embodiment of the battery module.
Figure 10:
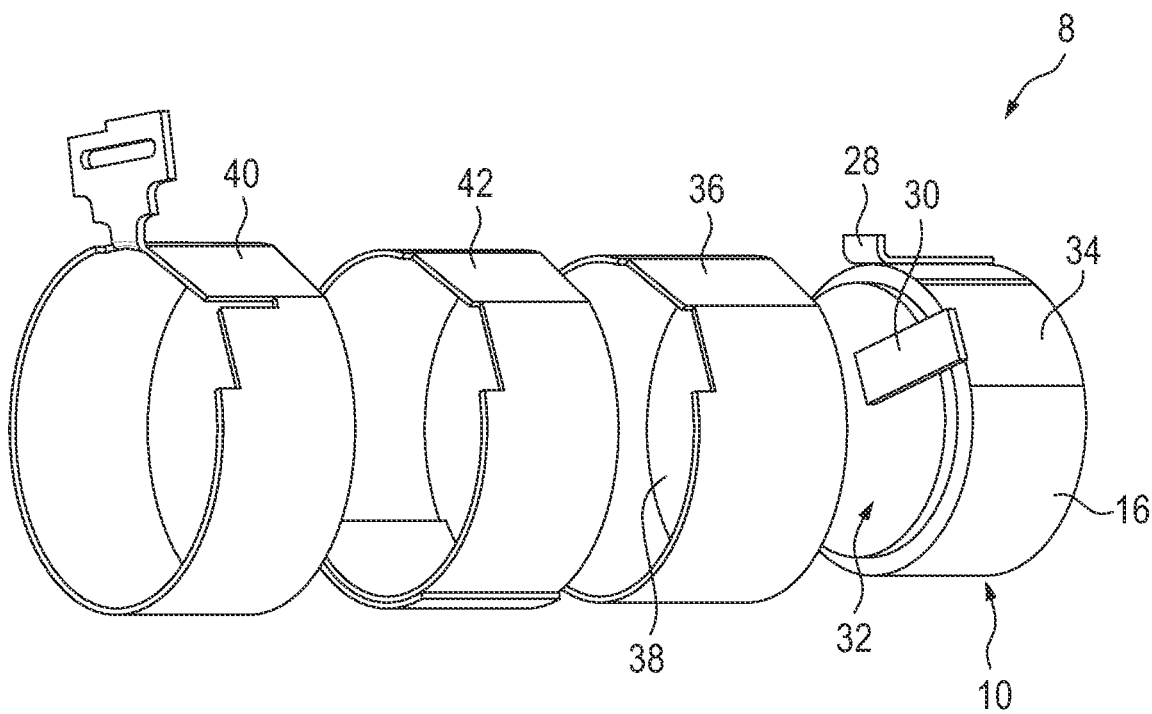
FIG. 10 shows the battery module according to FIG. 9 in the view according to FIG. 3.
Figure 11:
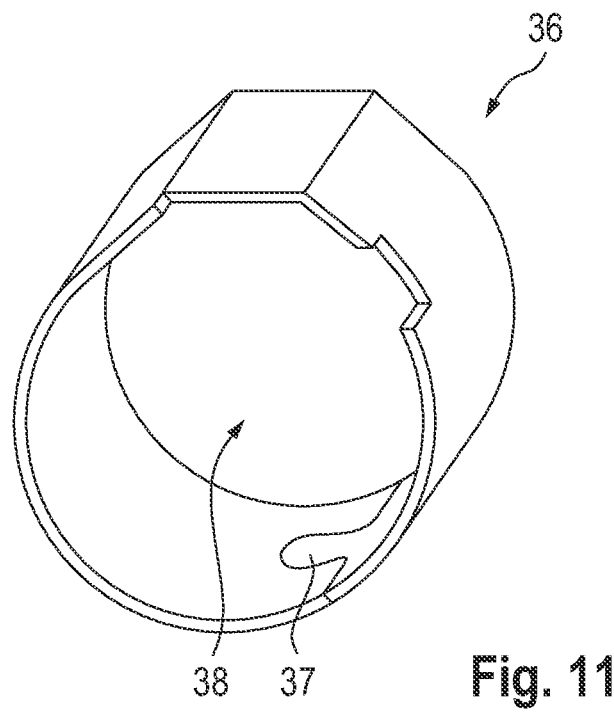
FIGS. 11 and 12 show the copper jacket and a ferrite jacket of the battery module, respectively, according to FIG. 9 in a view according to FIG. 8.
Figure 12:
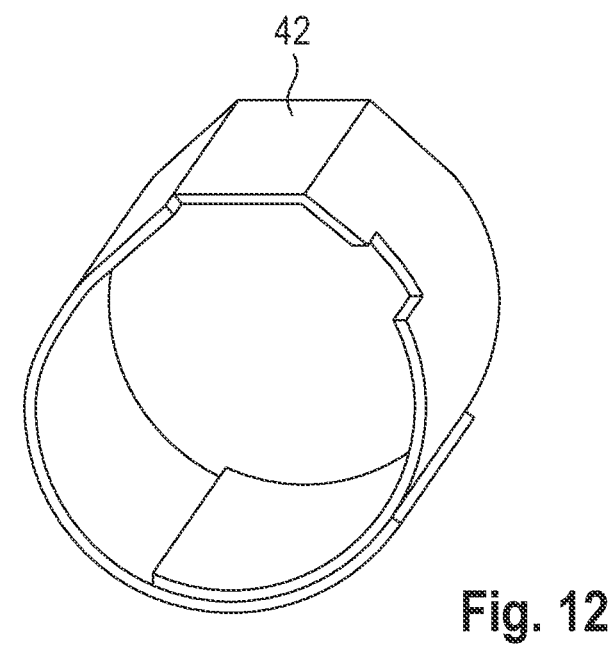

A copper jacket 36 is placed around the secondary cell 10 and the two contact elements 28 and 30. Said copper jacket is formed from a copper film which has a thickness of 0.13 millimeters, is coated with an insulation layer, is cut to size to form a strip and is placed to form a ring, wherein the two ends of the strip overlap one another in an abutment region 37 (see FIG. 8). The copper jacket 36 also has a bottom layer or bottom surface 38 which covers that end face of the secondary cell 10 which forms the positive pole 16. This bottom surface 38 is likewise formed from the insulated copper film. The battery module 8 also has a circuit carrier in the form of a folded printed circuit board 40 having conductor tracks (not illustrated in any more detail) for connecting the secondary cell 10 and the induction coil 12 to circuits arranged downstream, for example the rectifier circuit 20, the signal processor of the ITE 1 etc. The fuse 14, the resonant capacitor 18 and the thermistor 26 are also connected to and held on the printed circuit board 40. The two contact elements 28 and 30 likewise make contact with the printed circuit board 40, specifically with conductor tracks arranged on the latter.

The battery module 8 also has a ferrite jacket 42 which is arranged on the outside of the copper jacket 36. In the present exemplary embodiment, the ferrite jacket 42 is injection-molded from a plastic filled with ferrite (in particular with soft magnetic ferrite) and is therefore comparatively rigid and inherently stable. The induction coil 12 in the form of a wire coil, with two windings in the present exemplary embodiment, is wound around the ferrite jacket 42. The induction coil 12 likewise makes contact with the printed circuit board 40.

Figure 5:
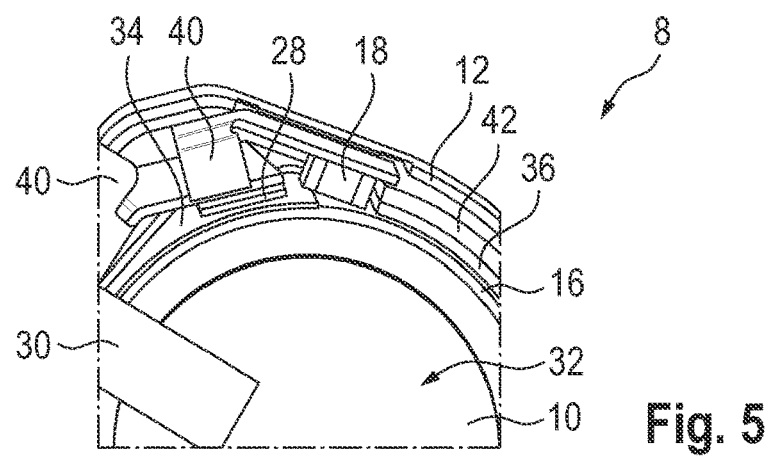
FIGS. 5, 6, 7 each shows a schematic detailed view of the battery module.

FIG. 5 illustrates the position of the resonant capacitor 18. Although the resonant capacitor 18 is arranged on an inner side of the printed circuit board 40 facing away from the induction coil 12, the resonant capacitor 18 is arranged at the shortest possible distance from the induction coil 12 with respect to the line length (specifically conductor track length) between the induction coil 12 and the resonant capacitor 18. Again, the shortest possible distance here is referred to as "close vicinity." This makes it possible to reduce or avoid parasitic inductances and/or capacitances, with the result that the precision with which the resonant frequency is set is particularly high.

Figure 6:
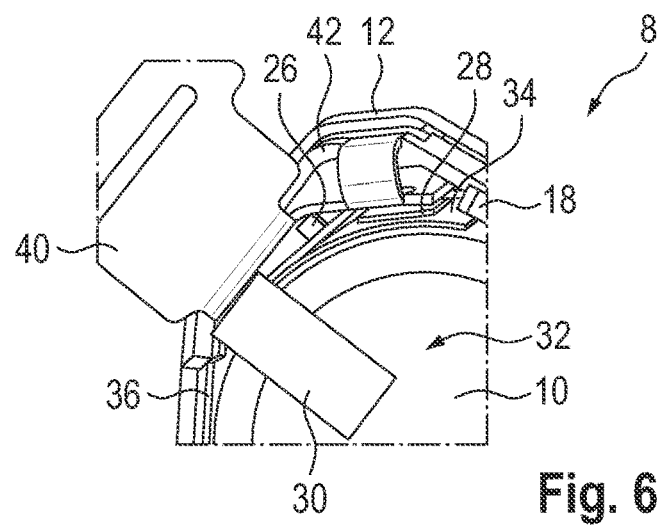

It is clear from FIG. 6 that the thermistor 26 is arranged directly on the copper jacket 36. On account of the insulation layer of the copper jacket 36, a short circuit of the two connections of the thermistor 26 is prevented via the copper material. Since the copper jacket 36 is comparatively thin and has a high material-related thermal conductivity, only negligible thermal losses also occur during heat conduction between the secondary cell 10 and the thermistor 26.

Figure 7:
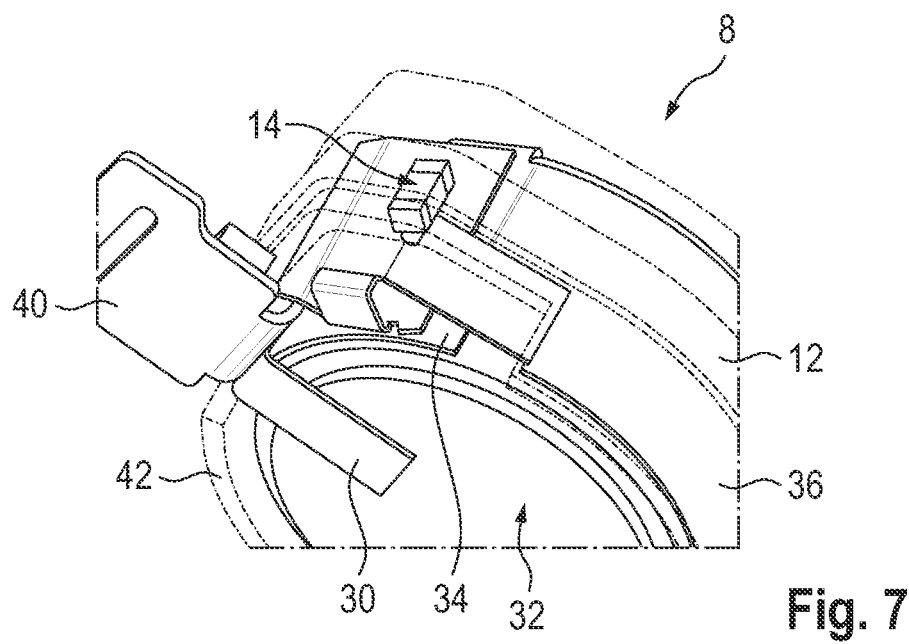

FIG. 7 illustrates the position of the fuse 14 which is arranged, over the thickness of the printed circuit board 40, opposite the first contact element 28 on the printed circuit board 40 and therefore has approximately direct connection to the first contact element 28 assigned to the positive pole 16. FIG. 7 transparently illustrates the components arranged outside the printed circuit board 40, specifically the ferrite jacket 42 and the induction coil 12.

FIGS. 9-14 illustrate a further exemplary embodiment of the battery module 8. In this case, the copper jacket 36 is formed from a copper film which has a thickness of 0.2 millimeters and, when placed in the form of a ring, forms an inherently stable pot (see FIG. 11). For connection in the abutment region 37, both ends of the film strip are designed with contrasting (complementary) hooking structures, similar to puzzle pieces, for connection according to the lock-and-key principle, specifically for a form-fitting connection, and are plugged into one another. In this case, the ferrite jacket 42 is formed from a flexible composite film which contains a ferrite-containing layer and is adhesively bonded onto the copper jacket 36. The printed circuit board 40 is in the form of a flexible printed circuit board which is placed in a manner encircling the ferrite jacket 42 as a ring on the outside, preferably is adhesively bonded. The induction coil 12 is in the form of repeatedly encircling conductor track on the printed circuit board 40.

Figure 13:
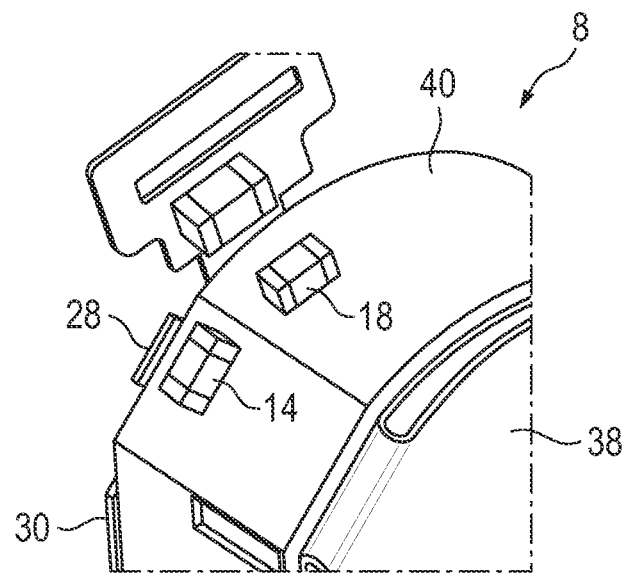
FIGS. 13 and 14 each shows a detailed view of the battery module according to FIG. 9 in a view according to FIG. 5.

As illustrated schematically in FIG. 13, the resonant capacitor 18 is arranged on the outside of the printed circuit board 40, specifically beside the conductor track forming the induction coil 12. In addition, the fuse 14 is arranged at a short distance from the first contact element 28, specifically its contact point with a corresponding conductor track of the printed circuit board 40.

Figure 14:
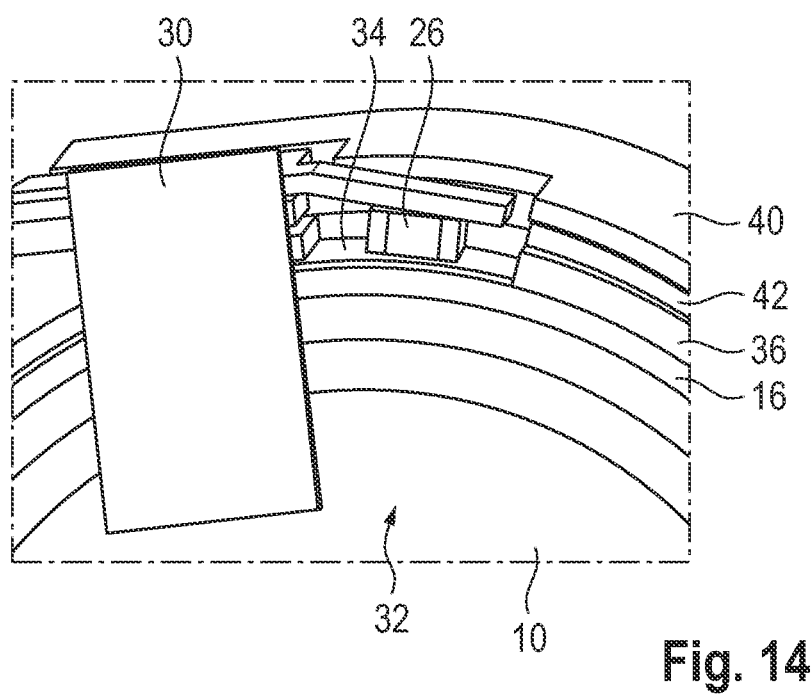

FIG. 14 illustrates that, in this exemplary embodiment, the thermistor 26 rests on the film 34 on the secondary cell 10, with the result that only a particularly low thermal resistance must be bridged.

The subject matter of the invention is not restricted to the exemplary embodiments described above. Rather, further embodiments of the invention can be derived from the above description by a person skilled in the art. In particular, the individual features of the invention and their configuration variants, described on the basis of the various exemplary embodiments, can also be combined with one another in another manner.

The following is a summary list of reference numerals and the corresponding structure used in the above description of the invention:

1 ITE
2 Housing
4 Faceplate
6 Microphone opening
8 Battery module
10 Secondary cell
12 Induction coil
14 Fuse
16 Positive pole
18 Resonant capacitor
20 Rectifier circuit
22 Diode
24 Smoothing capacitor
26 Thermistor
28 Contact element
30 Contact element
32 Negative pole
34 Film
36 Copper jacket
37 Abutment region
38 Bottom surface
40 Printed circuit board
42 Ferrite jacket

The invention claimed is:

1. A battery module for a hearing device, the battery module comprising:
a secondary cell having a positive potential and a negative potential;
two contact elements, including a contact element for making contact with the positive potential of said secondary cell and a contact element for making contact with the negative potential of said secondary cell;
a fuse arranged in close vicinity of said contact element for making contact with the positive potential;
a copper jacket surrounding said secondary cell;
a ferrite jacket arranged on an outside of said copper jacket;
an induction coil arranged on an outside of said ferrite jacket, said induction coil being configured to inductively receive energy;
a resonant capacitor connected to said induction coil in close vicinity of said induction coil; and
a thermistor for monitoring a cell temperature, said thermistor being electrically insulated with respect to said secondary cell but thermally coupled to said secondary cell with low thermal resistance for heat transfer between said secondary cell and said thermistor.

2. The battery module according to claim 1, wherein said two contact elements are electrically insulated with respect to said secondary cell at least in certain sections by an insulation layer in an intended assembly state.

3. The battery module according to claim 2, wherein said thermistor rests on said insulation layer.

4. The battery module according to claim 1, wherein said ferrite jacket is an inherently stable injection-molded component.

5. The battery module according to claim 1, wherein said ferrite jacket is formed of a flexible film material.

6. The battery module according to claim 1, wherein said copper jacket is formed of a copper film.

7. The battery module according to claim 6, wherein said copper film is coated with an insulation layer at least on an inside of said copper jacket.

8. The battery module according to claim 7, wherein copper film is also coated with an insulation layer on an outside of said copper jacket, and said thermistor rests on said copper film on the outside.

9. The battery module according to claim 6, wherein said copper film has a thickness of 0.2 millimeters and is a strip with hooking structures which are complementary to one another at respective ends and are hooked into one another to form a ring jacket.

10. The battery module according to claim 6, wherein said copper film of said copper jacket has a thickness of at least 0.08 millimeters and no more than 0.15 millimeters, and wherein said induction coil is applied to said ferrite jacket as a braided coil or wire coil.

11. The battery module according to claim 10, wherein said copper film of said copper jacket has a thickness of approximately 0.13 millimeters.

12. The battery module according to claim 1, further comprising a circuit carrier carrying said fuse, said resonant capacitor, and said thermistor.

13. The battery module according to claim 12, wherein said circuit carrier is a flexible circuit carrier arranged to encircle said ferrite jacket, and said flexible circuit carrier carries said induction coil formed as a conductor track.

14. The battery module according to claim 1, wherein:
said two contact elements are electrically insulated with respect to said secondary cell at least in certain sections by an insulation layer in an intended assembly state;
said thermistor rests on said insulation layer;
said ferrite jacket is formed of a flexible film material;
said copper film has a thickness of 0.2 millimeters and is a strip with hooking structures which are complementary to one another at respective ends and are hooked into one another to form a ring jacket; and
said fuse, said resonant capacitor, and said thermistor are carried on a circuit carrier.

15. A hearing device, comprising a battery module having:
a secondary cell having a positive potential and a negative potential;
two contact elements, including a contact element for making contact with the positive potential of said secondary cell and a contact element for making contact with the negative potential of said secondary cell;
a fuse arranged in close vicinity of said contact element for making contact with the positive potential;
a copper jacket surrounding said secondary cell;
a ferrite jacket arranged on an outside of said copper jacket;
an induction coil arranged on an outside of said ferrite jacket, said induction coil being configured to inductively receive energy;
a resonant capacitor connected to said induction coil in close vicinity of said induction coil; and a thermistor for monitoring a cell temperature, said thermistor being electrically insulated with respect to said secondary cell but thermally coupled to said secondary cell with low thermal resistance for heat transfer between said secondary cell and said thermistor.

16. The hearing device according to claim 15, configured as a hearing aid device.

17. The hearing device according to claim 15, configured as an in-the-ear (ITE) hearing aid.

* * * * *